United States Patent [19]

Duckworth

[11] Patent Number: 4,630,809
[45] Date of Patent: Dec. 23, 1986

[54] VIBRATION ISOLATOR AND SHOCK ABSORBER DEVICE

[75] Inventor: Allen Duckworth, Middlefield, Conn.

[73] Assignee: Teleco Oilfield Services Inc., Meriden, Conn.

[21] Appl. No.: 732,928

[22] Filed: May 13, 1985

[51] Int. Cl.⁴ .................................................. F16F 3/08
[52] U.S. Cl. .............................. 267/141.1; 267/125; 267/141.7
[58] Field of Search ............ 188/268; 267/63 A, 125, 267/141, 141.1, 141.2, 141.3, 141.7, 153

[56] References Cited

U.S. PATENT DOCUMENTS

| | | | |
|---|---|---|---|
| 3,391,892 | 7/1968 | Neidhart et al. | 267/141.7 |
| 3,751,024 | 8/1973 | Pineau | 267/153 |
| 4,265,305 | 5/1981 | Stone et al. | 267/141.2 X |

FOREIGN PATENT DOCUMENTS

| | | | |
|---|---|---|---|
| 692719 | 6/1940 | Fed. Rep. of Germany | 267/63 A |
| 755629 | 8/1951 | Fed. Rep. of Germany | 267/63 A |
| 1365864 | 5/1964 | France | 267/63 A |
| 476603 | 12/1952 | Italy | 267/63 A |

Primary Examiner—Duane A. Reger
Attorney, Agent, or Firm—Fishman & Dionne

[57] ABSTRACT

A vibration isolator and shock absorber device is presented wherein elastomeric vibration isolation elements interact with reaction elements to form differential springs, i.e., springs in which the deflection and load characteristics change with load. In the present invention, the load characteristics change from shear at low loading to compression at high loading, with a smooth transition between shear and compression.

8 Claims, 8 Drawing Figures

VIBRATION ISOLATOR AND SHOCK ABSORBER DEVICE

BACKGROUND OF THE INVENTION

This invention relates to the field of vibration isolation and shock absorption. More particularly, this invention relates to the field of vibration isolation and shock absorption in borehole telemetry, especially mud pulse telemetry wherein data relating to borehole parameters is gathered by sensing instruments located downhole in the drillstring and is transmitted to the surface via pressure pulses created in the drilling mud. The mud pulse telemetry apparatus and associated sensor apparatus are high precision equipment which are installed in a special section of the drillstring close to the drill bit or mud motor. This precision equipment must be protected from the shock and vibration caused by drilling operations.

The basic concept of mud pulse telemetry for transmitting borehole data from the bottom of a well to the surface has been known for some time. U.S. Pat. Nos. 4,021,774, 4,013,945 and 3,982,431, all of which are owned by the assignee of the present invention and which are incorporated herein by reference in their entirety, show various aspects of a mud pulse telemetry system. Mounting and shock absorber assemblies intended for use in mud pulse telemetry systems are shown in U.S. Pat. Nos. 3,714,831, 3,782,464 and 4,265,305, the latter of which is assigned to the assignee hereof and all of which are incorporated herein by reference in their entirety. The mounting and shock absorber assembly of previously mentioned U.S. Pat. No. 4,265,305 has been in commercial use in the mud pulse telemetry system operated by the assignee hereof. While the mounting and shock absorber assembly of that patent and the others referred to above are adequate for their intended purposes, they have certain drawbacks. For example, the systems of U.S. Pat. No. 3,714,831 and 3,782,464 require that the drill collar in which they are mounted be in two pieces in order to have access to the shock absorber elements for assembly. That requirement for a two piece drill collar poses several disadvantages, discussed in more detail in U.S. Pat. No. 4,265,305. While the system disclosed in U.S. Pat. No. 4,265,305 eliminates the problem of the requirement for a two piece drill collar, that system (and those of U.S. Pat. Nos. 3,714,831 and 3,782,469) requires two different kinds of elements, and it experiences a discontinuity in its load absorption characteristics. The system of U.S. Pat. No. 4,265,305 is made up of essentially two elements: a series of elastomeric rings which function as springs or isolators, and a bumper structure. The elastomeric rings have a relatively low constant spring rate, while the bumper structure has a relatively high spring rate. The isolators or elastomeric springs are characterized by relatively high displacement for relatively low forces; and the bumper structure is characterized by having relatively low displacement for relatively high forces. The shock absorber structure of U.S. Pat. No. 4,265,305 usually operates over a range in which both the elastomeric springs or isolators and the bumpers are operative. As a result, and because of the different spring rate characteristics, a potentially serious discontinuity in load bearing characteristics occurs at the transition point between operation of the elastomeric springs or isolators and the bumper structures. This discontinuity is undesirable.

SUMMARY OF THE INVENTION

The present invention presents an improved vibration isolator and shock absorber device which both overcomes the problem discussed above and has other advantages. In the present invention, elastomeric vibration isolation elements interact with reaction elements to form differential springs, i.e., springs in which the deflection and load characteristics change with load. In the present invention, the load characteristics change from shear at low loading to compression at high loading, with a smooth transition between shear and compression. This eliminates the discontinuity encountered in the prior art devices discussed above. Also, the present invention eliminates the need for a separate bumper structure, since the elastomeric isolation elements and the reaction elements combine to form bumper structures at the extreme end of the operating range.

The present invention results in a system which has a low spring rate at small loads and deflections. As loads and deflections increase, the spring rate also increases, thus making the system progressively stiffer. Good damping of high frequency vibration is maintained throughout the working range of the system. Furthermore, the action of the system is bidirectional, and torsional and lateral damping and shock isolation are also provided.

While the vibration isolator and shock absorber system of the present invention is being shown and described in the environment of a suspension in a mud pulse telemetry system, it will be understood that the system may be employed in other structures and environments. The system can readily be adapted as a suspension system for heavy or light weight devices, and to provide for a greater or lesser range of travel. Furthermore, the characteristics of this system can be tailored to provide desired characteristics by contouring the elastomeric rings and/or the reaction elements.

The above discussed and other advantages of the present invention will be apparent to and understood by those skilled in the art from the following detailed description and drawings.

BRIEF DESCRIPTION OF THE DRAWINGS

Referring now to the drawings.

DESCRIPTION OF THE PREFERRED EMBODIMENT

Figure 1:
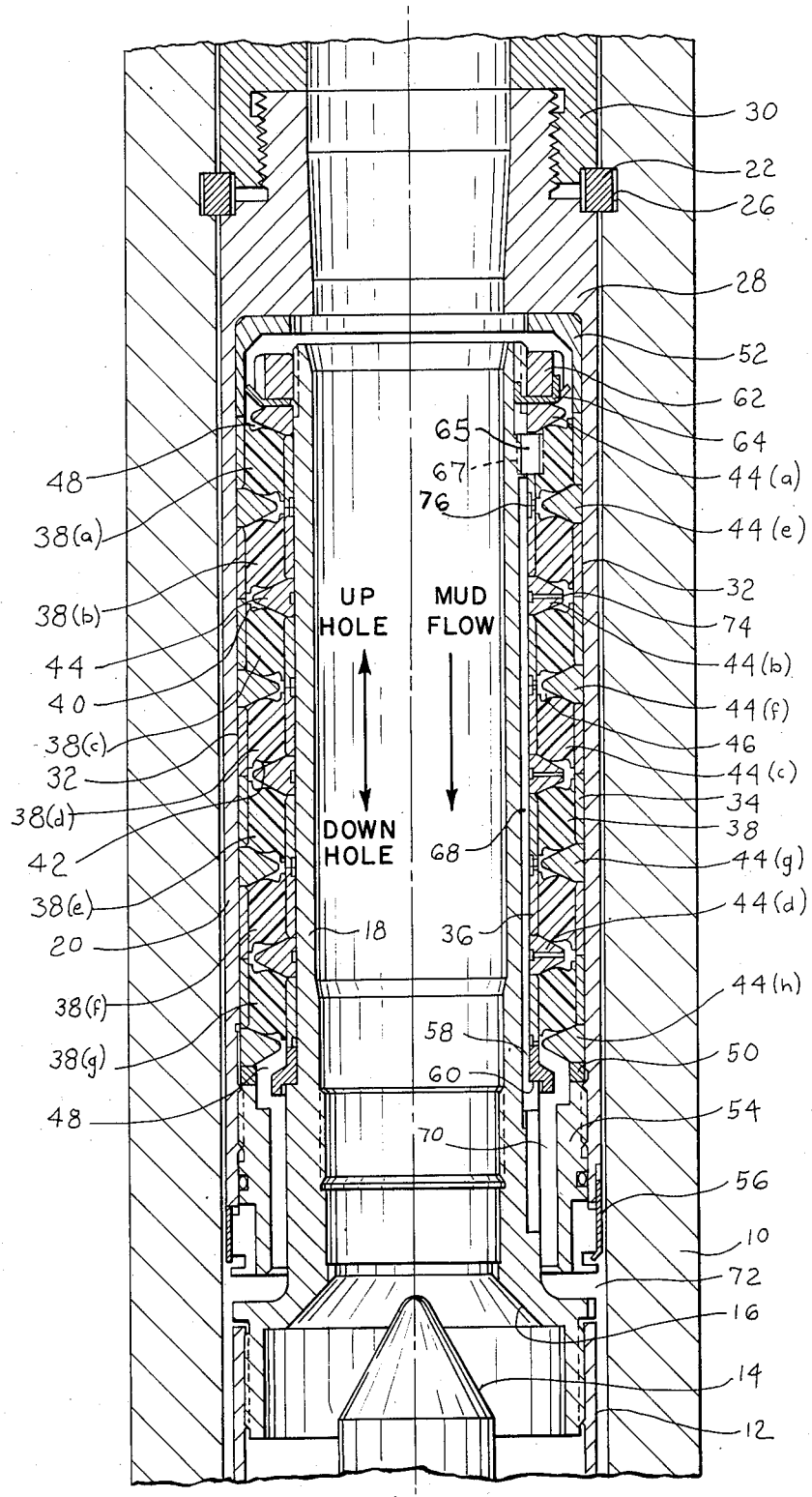
FIG. 1 shows a detailed sectional view of the improved vibration isolator and shock absorber of the present invention.

FIG. 1 of the present invention shows a sectional elevation view of the vibration isolator and shock absorber of the present invention for use in a mud pulse telemetry apparatus and system. To understand the environment in which the structure of FIG. 1 would be located, FIG. 1 corresponds, generally, to FIG. 2 of U.S. Pat. No. 4,265,305. That is, FIG. 1 shows a vibration isolator and shock absorber assembly positioned at the upper end of a mud pulse transmitter system within a drill collar 10.

The vibration isolation and shock absorbtion system of the present invention constitutes a suspension system for the valve body 12 which contains a mud pulse valve 14. Mud pulse valve 14 cooperates with a valve seat 16 to generate pressure pulses in drilling mud flowing downhole, as more fully described in some of the prior art patents identified above.

Valve body 12 is threadably connected to and suspended from a cylinder 18 which forms the inner suspension cylinder of the vibration isolator and shock absorber assembly of the present invention. Inner cylinder 18 provides the bore through which the drilling mud flows in the downhole direction. The suspension system also has an outer cylinder 20 which is rigidly attached to drill collar 10 by a split ring 22 which sits in a recess 26 in drill collar 10 and is locked to the enlarged upper end 28 of outer cylinder 20 by a ring nut 30.

The inner and outer cylinders 18 and 20 are mechanically connected together through an array of ring elements 32, seven of which are shown in the system of FIG. 1. Each of the ring elements 32 is composed of an outer steel ring 34, an inner steel ring 36, and a ring 38 of elastomeric material, such as rubber, extended between and being bonded to the outer and inner rings 34 and 36. The upper and lower surfaces 40 and 42 of the elastomeric rings 38 are contoured as shown in FIG. 1. The system also includes a series of steel reaction elements 44 positioned between each adjacent pair of ring elements 32. The reaction elements are alternately held between pairs of outer rings 34 and pairs of inner rings 36, and they extend into the spaces 46 between adjacent elastomeric rings 38 and into the end spaces 48 at the upper and lower ends of the assembly.

The outer steel rings 34 and the reaction elements held therebetween are locked to outer cylinder 20. The outer rings and the reaction elements held therebetween are held between a lower spacer 50 and an upper spacer 52 which abuts against the enlarged end portion 28 of outer cylinder 20. A retainer ring 54 is threadably connected to the interior of outer cylinder 20 and bears against lower spacer 50 and is locked in place by a locking ring 56. Thus, the outer rings 34 and the reaction elements held therebetween are locked to outer cylinder 20. Similarly, the inner rings 36 and the reaction elements held therebetween are locked to the inner cylinder 18 by a spacer ring 58 which abuts a shoulder 60 on an enlarged lower end of inner cylinder 18 and a locking nut 62 and lock washer 64 at the upper end of inner cylinder 18, the locking nut 62 being threadably engaged to the upper end of inner cylinder 18.

The inner ring 36 of the uppermost ring element 32 is locked to inner cylinder 18 by a key 65. Key 65 is positioned in a keyway 67 formed partly in each of the upper part of inner cylinder 18 and uppermost inner ring 36 and elastomeric element 44(a). Key 65 bridges the inner cylinder 18, the ring 36 and the elastomeric element 44(a) to lock them together against rotation. Thus, the uppermost ring element 32 is locked against rotation relative to inner sleeve 18. Since the inner and outer rings 36 and 34 of the lower ring elements 32 (i.e., those below the uppermost ring element) are loaded and locked together by the axial loads which lock them to their respective adjacent inner and outer cylinders, all rings 36 in the array are thus locked against rotation relative to inner cylinder 18. If necessary or desired, outer ring elements 34 can be similarly keyed to outer cylinder 20 to prevent rotation with respect thereto. However, the axial and friction forces should be sufficient to prevent such relative rotation.

Since the inner and outer cylinders 18 and 20 are connected together by the elastomeric rings 38 and the steel rings 34 and 36 to which they are bonded, shock and vibration loads imposed on the outer cylinder can be transmitted to the telemetry device only through the elastomeric rings. This provides for shock and vibration attenuation and damping in the longitudinal, lateral and torsional modes. The greatest shock loads imposed on the system are axial, caused by contact of the drill bit with the end of the hole, or by the operation of jarring devices should the drill string become stuck in the borehole. Additional downhole loads are caused by the suspended mass of the telemetry device and by the hydraulic pressure of the flowing mud. For these reasons, more elements of the system are designed to resist downward deflection than upward deflection—four elements versus 3 in the configuration shown in FIG. 1. This can be understood by noting that a downward loading on inner cylinder 18 will result in a load being imposed from each of the array of inner reaction elements 44a, 44b, 44c and 44d which interact with the outer array of reaction elements 44e, 44f, 44g and 44h to transmit loads through the elastomeric rings therebetween. That is, with a downward load, reaction element 44a transmits its load to reaction element 44e through the elastomeric ring therebetween; reaction element 44b transmits its load to 44f through the reaction element therebetween, reaction element 44c transmits its load to reaction element 44g through the elastomeric element therebetween and reaction element 44d transmits to reaction element 44h through the elastomeric element therebetween. Thus, with a downward load on inner cylinder 18, the load is transmitted through four sets of reaction elements and elastomeric elements. By way of contrast, when an upward load is imposed on inner cylinder 18, the load is transmitted only through three sets of reaction elements and elastomeric elements. Thus, with an upward load, reaction element 44d transmits to 44g through the elastomeric element therebetween, reaction element 44c transmits to reaction element 44f through the elastomeric element therebetween and reaction element 44b transmits to reaction element 44e through the elastomeric element therebetween. This ability to tailor the system to handle more load in one direction than another is an advantage of this system.

It is of utmost importance to note that in the unloaded condition there is a difference in contour between the surface of a reaction element 44 and the adjacent surface of an elastomeric element 38. It is extremely important to the operation of the present invention that either one or both of the abutting faces of at least some of the support elements 44 and adjacent elastomeric elements 38 be curved. That is, one of these abutting faces must be curved and the other straight, or both may be curved; but for proper functioning of the present invention both cannot be straight surfaces with uniformly increasing spacing therebetween in all cases. The contouring of one or both of these surfaces relative to the other provides for a differentially increasing spacing between these two surfaces as one moves outwardly or inwardly in the radial direction with respect to the axis of inner cylinder 18. As can be understood from an examination of FIGS. 1 and 2, the amount of surface contact between a reaction element 44 and an adjacent surface 42 of a elastomeric element 38 will increase with an increasing load applied to inner cylinder 18.

The differential spacing between the surface of a reaction element 44 and its adjacent elastomeric element 44 and its adjacent elastomeric element 38 results in a differential spring rate which increases as contact increases between the surface of the reaction element and the surface of the elastomeric element. As distinguished from the prior art (as exemplified by U.S. Pat. Nos. 4,265,305, 3,782,464 and 3,714,831 ) in which there is a sharp discontinuity and increased spring rate when the end bumpers are contacted, the system of the present invention provides a smooth transition from shear loading to compression loading on the elastomeric elements.

Figure 2A:
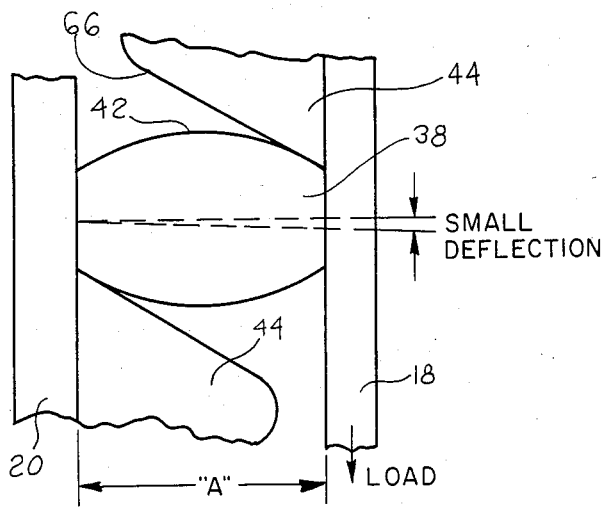
FIGS. 2A–2F show load versus deflection characteristics for various stages of loading of the vibration isolator and shock absorber of the present invention.
Figure 2B:
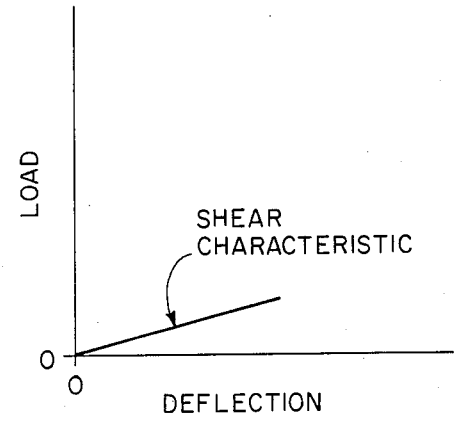

This important feature of the present invention is illustrated in FIGS. 2A–2F. FIGS. 2A and 2B illustrate a low load situation where there has been a small downward load and small downward deflection of inner cylinder 18. In the low load situation depicted in FIG. 2A, elastomeric member 38 is deflected in a shear mode. The effective width of the flexible elastomeric member 38 is shown as dimension "A". In the load condition depicted in FIG. 2A, this effective width "A" is at a maximum, and the spring rate of the suspension system is at a minimum. This provides the greatest damping and isolation from high frequency, low amplitude disturbances. A load versus deflection curve for the suspension system in the configuration shown in FIG. 2A is depicted in FIG. 2B.

Figure 2C:
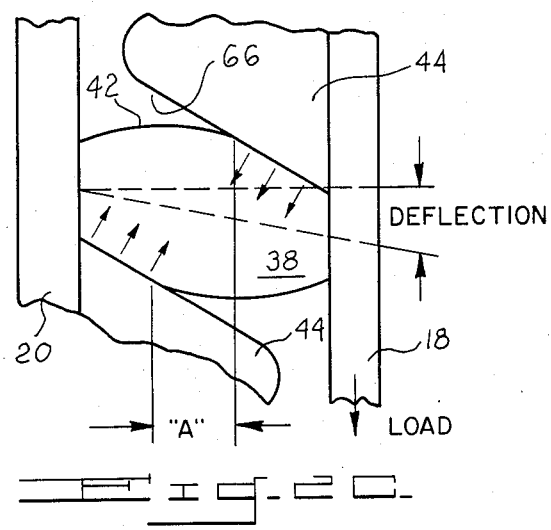
Figure 2D:
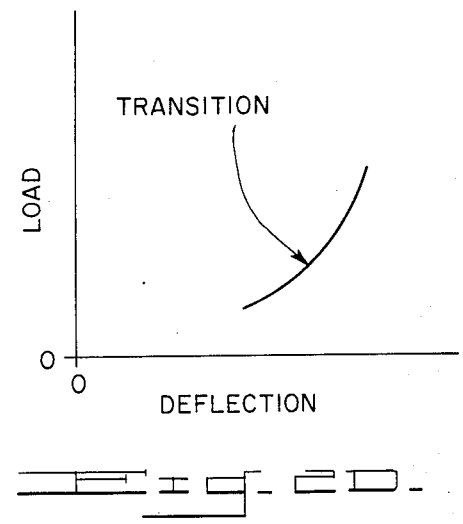

FIG. 2C depicts a situation in which a higher load has been imposed on the system. The higher load results in an increased deflection of inner cylinder 18, which, in turn, results in an increased area of contact between the contoured surfaces 42 of elastomeric member 38 and the reaction surface 66 of each of the abutting reaction elements 44. Because of the increased contact between the surfaces 66 and 42, the flexure length "A" is reduced, thus causing an increase in the stiffness of the assembly. Also, the elastomeric member comes under compression loading, indicated by the arrows, in the areas of increased contact between surfaces 66 and 42. As a result, the stiffness of the assembly increases, and this increase in stiffness becomes progressively greater as the deflection increases. The introduction of compressive forces also provides an additional increase in resistance to motion. Thus, the resistance of the suspension assembly to motion becomes steadily greater as the deflecting load is increased; and the characteristic of loading goes through a transition from shear to compression. FIG. 2D is a load versus deflection curve showing the transition range responding to the condition shown in FIG. 2C.

Figure 2E:
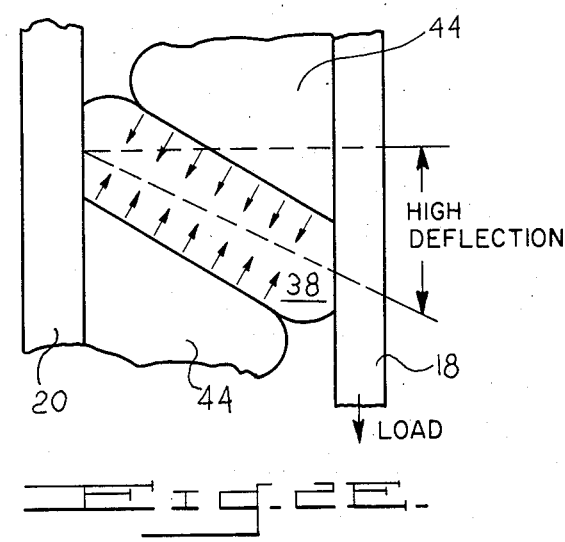
Figure 2F:
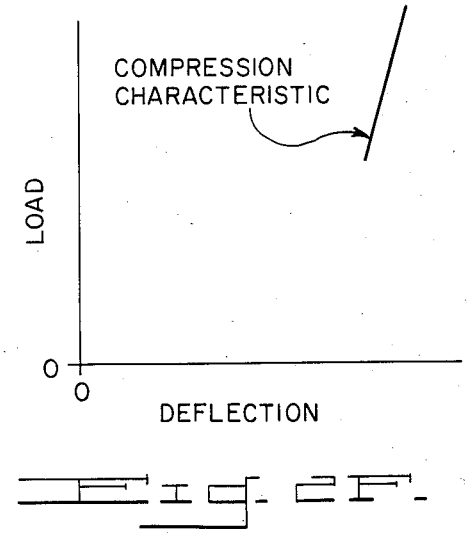

When cylinder 18 undergoes a large enough deflection so that the entire faces 66 of the reaction elements 44 are in contact with the abutting faces 40 or 42 of the elastomeric elements, the system is in full compressive loading. This condition is illustrated in FIG. 2E, with the compressive loading being shown by the arrows. Any further loading and deflection of inner cylinder 18 results in compressive deformation of the elastomeric member. Since the elastomer has a much greater resistance to compressive deformation than to shear deflection, the suspension assembly, though still compliant, becomes extremely stiff. FIG. 2F is a load versus deflection curve showing the compression characteristic of the configuration depicted in FIG. 2E.

For downhole deflection, the mode of operation described above with respect to FIGS. 2A–2F applies to four of the seven elastomeric rings in the embodiment of FIG. 1, those being elastomeric elements 38a, 38c, 38e and 38g. The other three elastomeric members are not subject to compressive loading with a load in the downward direction, but they contribute a shear reaction over the entire range of travel.

For uphole loading and uphole deflection of inner cylinder 18, elastomeric rings 38b, 38d, and 38f undergo the transition from shear to compressive loading as described above in connection with FIG. 2 and the other four elastomeric elements are loaded in shear only.

A vent passage 68 is provided in inner cylinder 18, and then passage 68 communicates with passages 70 and 72 to the space between drill collar 10 and the interior components. Each of the spaces 46 between adjacent elastomeric elements is vented to vent passage 68. This is accomplished either by vent passages 74 in the inner array of reaction elements or by vent passages 76 in inner rings 36 at the location of those spaces 46 which are populated by reaction elements of the outer array. In this manner, each of the spaces 46 is vented to external fluid pressure to assure pressure equalization and prevent build up of pressure in the spaces between the elastomeric elements. It is to be noted that these vent passages and vent systems do not form a continuous flow passage for passage of mud through the suspension system. The venting system stops at the uppermost elastomeric element 38a and does not communicate with the interior of the system at that upper end. Thus, there is only tidal and pressure equalization mud flow between the interior of the suspension system and the exterior. There is no continuous mud flow path through the suspension system which might cause erosion of the elastomeric elements.

Figure 3:
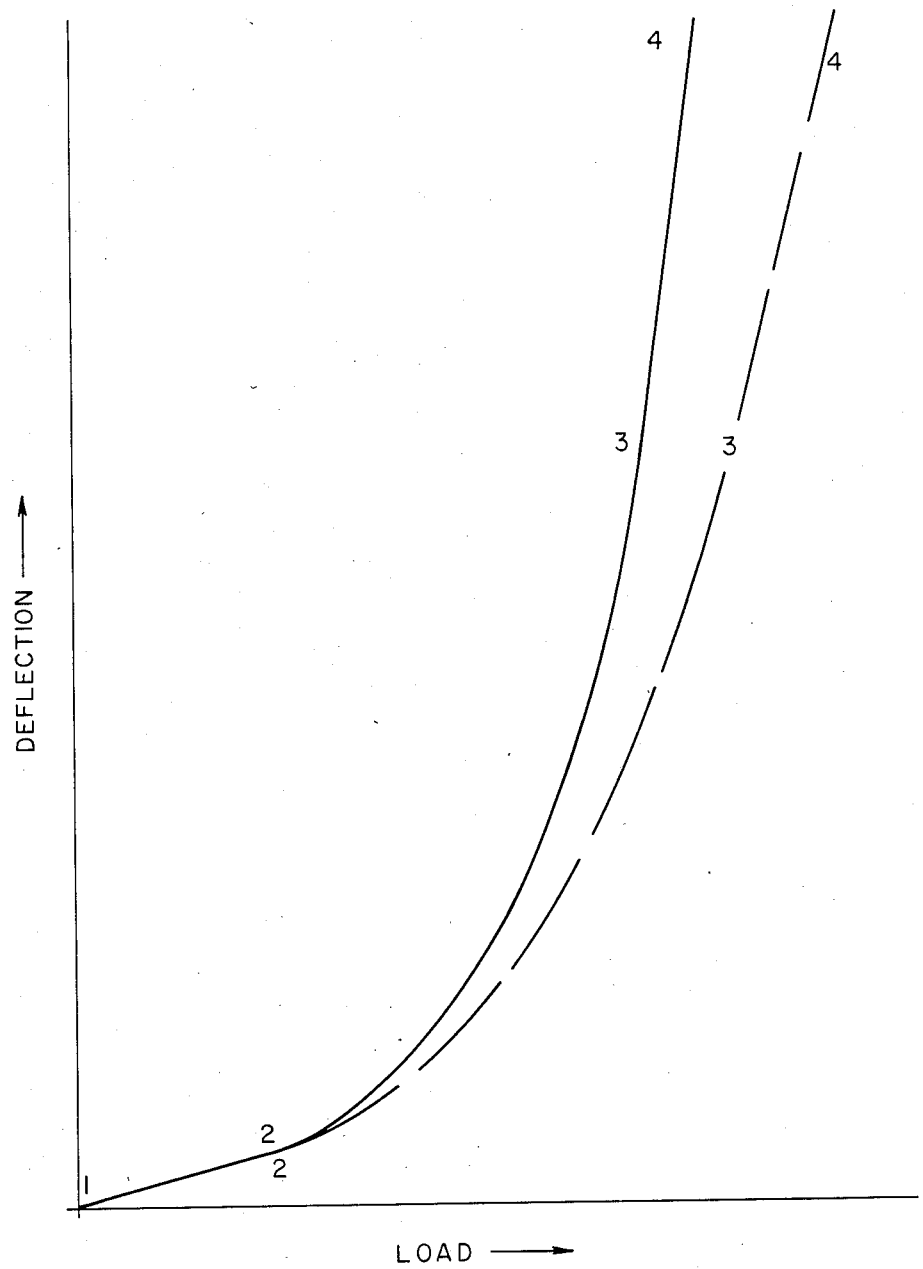
FIG. 3 shows a load versus deflection curve for the device of the present invention.

FIG. 3 shows a graph of load versus deflection for the complete suspension system and shows the progressive changes in stiffness described above. The solid line in FIG. 3 depicts the load and spring characteristics for downward load and deflection, and the broken line shows load and spring characteristics for upward loading and deflection. Section 1 to 2 of each line shows shear deformation characteristics of the elastomer. Section 2 through 3 of each line is a transition range showing transition from shear to compressive loading. Section 3 through 4 of each line shows compression loading characteristics.

By selection of elastomer properties, varying the number and dimensions of the elements of the suspension system, and by changing the contour of the elastomer and support elements, the characteristics of the suspension can be changed to accommodate a wide range of requirements. Also, the difference in resistance to uphole and downhole loading and motion can be modified as required.

It is of interest to note in the present invention that a higher spring rate or stiffness can be incorporated into the suspension system in a given space than can be achieved with the system of U.S. Pat. Nos. 4,265,305, 3,782,464 and 3,714,831. This result is achieved in the present invention because the entire space available for the suspension system can be populated by the elastomeric rings; and no space need be devoted to end bumpers or other structure.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A vibration isolator and shock absorber device having a longitudinal axis and including:
   a plurality of ring elements in an array, each of said ring elements having an outer ring, an inner ring, and elastomeric material extending between and adhered to said rings, said inner and outer rings being substantially parallel to said longitudinal axis;
   means for connecting said outer rings to an outer support member;
   means for connecting said inner rings to an inner support member;
   at least one reaction element positioned between an adjacent pair of said ring elements, said reaction element extending from one of said inner or outer rings into a space between the elastomeric materials of said pair of adjacent ring elements, said reaction element having reaction surfaces facing the adjacent surfaces of each of said adjacent elastomeric materials; and
   at least one of said reaction surfaces and surface of the elastomeric material adjacent thereto being differently contoured.

2. The vibration isolator and shock absorber device of claim 1 wherein:
   said one reaction surface and the surface of the elastomeric element adjacent thereto are contoured to define a differential spacing therebetween in the unloaded state.

3. The vibration isolator and shock absorber device of claim 1 including:
   means to vent said space between the elastic materials of said pair of ring elements.

4. The vibration isolator and shock absorber device of claim 1 wherein:
   a reaction element is positioned between each adjacent pair of ring elements.

5. The vibration isolator and shock absorber device of claim 4 wherein:
   said one reaction surface of each reaction element has an increasing area of contact with each adjacent pair of ring elements with correspondingly increasing load.

6. The vibration isolator and shock absorber device of claim 1 wherein:
   at least one of said reaction surfaces and adjacent surfaces of said adjacent elastomeric materials be curved.

7. A vibration isolator and shock absorber device including:
   a plurality of ring elements in an array, each of said ring elements having an outer ring, an inner ring, and elastomeric material extending between and adhered to said rings;
   means for connecting said outer rings to an outer support member;
   means for connecting said inner rings to an inner support member;
   at least one reaction element positioned between an adjacent pair of said ring elements, said reaction element extending from one of said inner or outer rings into a space between the elastomeric materials of said pair of adjacent ring elements, said reaction element having reaction surfaces facing the adjacent surfaces of each of said adjacent elastomeric materials; and
   at least one of said reaction surfaces and surface of the elastomeric material adjacent thereto being differently contoured wherein said one reaction surface and the surface of the elastomeric element adjacent thereto are contoured to define a differential spacing therebetween in the unloaded state.

8. A vibration isolator and shock absorber device including:
   a plurality of ring elements in an array, each of said ring elements having an outer ring, an inner ring, and elastomeric material extending between and adhered to said rings;
   means for connecting said outer rings to an outer support member;
   means for connecting said inner rings to an inner support member;
   at least one reaction element positioned between an adjacent pair of said ring elements, said reaction element extending from one of said inner or outer rings into a space between elastomeric materials of said pair of adjacent ring elements, said reaction element having reaction surfaces facing the adjacent surfaces of each of said adjacent elastomeric materials wherein a reaction element is positioned between each adjacent pair of ring elements; and
   at least one of said reaction surfaces and surface of the elastomeric material adjacent thereto being differently contoured wherein said one reaction surface of each reaction element has an increasing area of contact with each adjacent pair of ring elements with correspondingly increasing load.

* * * * *